United States Patent [19]

Norwood

[11] 3,887,484

[45] June 3, 1975

[54] HALOALKYLATION AGENT OF AROMATIC HYDROCARBONS

[75] Inventor: Amos Norwood, Philadelphia, Pa.

[73] Assignee: Sybron Corporation, Rochester, N.Y.

[22] Filed: Nov. 16, 1972

[21] Appl. No.: 307,021

[52] U.S. Cl... 252/188.3 R; 252/429 A; 252/429 B; 260/2.1 C
[51] Int. Cl............................................. C09k 3/00
[58] Field of Search..... 252/188.3 R, 429 B, 429 A; 260/2.1 C

[56] References Cited
UNITED STATES PATENTS 3,524,896  8/1970  Bozik et al. ..................... 252/429 B Primary Examiner—Stephen J. Lechert, Jr.
Attorney, Agent, or Firm—Theodore B. Roessel; Ernest F. Chapman; Papan Devnani

[57] ABSTRACT

Haloalkylated aromatic compounds including monomers, polymers and copolymers having at least one substitutable nuclear hydrogen per aromatic nucleus, are produced by reacting said compounds with the reaction product of a formaldehyde source, a suitable polar liquid, sulfuric acid and a halide source. When the formaldehyde source comprises methylal, the polar liquid may be omitted. A haloalyklating agent useful for haloalkylating aromatic compounds having at least one substitutable nuclear hydrogen per aromatic nucleus has also been prepared. The haloalkylation process and products are particularly useful in haloalkylating polymers and copolymers for the preparation of anion exchange resins having improved operating capacity.

8 Claims, No Drawings

HALOALKYLATION AGENT OF AROMATIC HYDROCARBONS

BACKGROUND OF THE INVENTION

This invention relates to an improved process and product for haloalkylation, and more particularly, to a process and product for the haloalkylation of aromatic compounds containing at least one substitutable nuclear hydrogen per aromatic nucleus.

Processes for the haloalkylation of aromatic compounds including aromatic compounds of high molecular weight, such as, polymers of aromatic vinyl compounds have been carried out in the prior art. Examples of prior art haloalkylation processes are found in U.S. Pat. Nos. 2,630,459, 2,846,480, 2,900,352, 3,297,648, 3,417,066, and 3,425,990. These patents illustrate that many different materials have been employed as haloalkylating agents, for example, reaction mixtures of paraformaldehyde and hydrogen chloride; reaction mixtures of methylal and/or formaldehyde polymers of relatively low molecular weight and aluminum chloride; reaction mixtures of formaldehyde polymers of relatively low molecular weight, chlorosulphonic acid and alcohols or other polar oxygen-containing liquids; methylal and sulphuryl chloride in the presence of a Friedel-Crafts catalyst; mixtures with methylal, chlorosulphonic acid and sulfuryl chloride; and a mixture of approximately equal molar quantities of methylal and chlorosulphonic acid.

These known processes have the disadvantages of using or evolving gaseous hydrogen chloride; the reactions are hazardous; they leave large proportions of unreacted aromatic hydrocarbons, that is, there is only minimal haloalkylation; or they form undesirable haloalkylated products from side reactions. Furthermore, certain of the haloalkylation agents cause such considerable crosslinking of the compounds of high molecular weight that, unless swelling agents are also used, they can in practice only be used for the haloalkylation of compounds of high molecular weight when the compounds are not crosslinked. In U.S. Pat. No. 2,846,480, the chloromethylation of an alkyl benzene is carried out with sulfuric acid, formaldehyde, a primary alcohol and a chlorine-containing compound which will engender hydrogen chloride. The chlorine-containing compounds which will engender the hydrogen chloride in the presence of an alcohol and sulfuric acid are phosphorus trichloride, phosphorus pentachloride, sulfuric oxychloride, sulfurous oxychloride and acyl chlorides such as acetyl chloride. Since a corrosive gas is formed in U.S. Pat. No. 2,846,480 the process for haloalkylation is undesirable.

Haloalkylation of compounds containing aromatic groups to substitute a haloalkyl group for a nuclear aromatic hydrogen is an important process in the production of anion exchange resins and in other reactions where haloalkylated aromatic compounds are desirable products or intermediates. Typically, haloalkylation of many of these compounds is carried out by reacting a haloalkyl ether with the aromatic compound being treated in the presence of a suitable catalyst. Examples of haloalkylation of anion exchange resins are found in U.S. Pat. Nos. 2,591,573, 2,629,710, 2,788,330 and 3,625,870. In the haloalkylation of aromatic compounds it is generally desirable to substitute as many of the nuclear hydrogens as possible with haloalkyl groups, especially when such groups provide sites for the desired function of the material. Thus, for example, in the production of anion exchange resins, after haloalkylation the resin is aminated to provide strong and weak base sites on the aromatic nuclei of the resin. These sites account for the anion exchange properties of the resin. Attempts have been made to increase the rate and degree of haloalkylation, and such attempts are disclosed in U.S. Pat. Nos. 3,311,602 and 3,625,870. However, the process in the former results in undue swelling of the resin bead with a resultant loss of strength in the bead thereby making subsequent treatment thereof substantially impossible when the haloalkylation is applied to resin materials for the preparation of anion exchange resin, and the process in the latter patent, although it results in a substantial improvement in the degree of haloalkylation of aromatic compounds, it does not eliminate the possibility of preparing aromatic compounds having an improved degree of haloalkylation.

OBJECTS OF THE INVENTION

Accordingly, it is an object of this invention to provide a method for haloalkylating compounds containing aromatic groups where the degree of haloalkylation is substantially improved without deleterious effects on the compound being treated.

It is another object of this invention to provide a haloalkylating agent which may be prepared and stored for utilization in haloalkylation of compounds containing at least one nuclear hydrogen-containing aromatic group.

It is another object of this invention to provide an improved method for the production of anion exchange resins.

It is another object of this invention to provide a method for the production of anion exchange resins having substantially improved total capacity.

Other objects and advantages of this invention will become apparent from the following detailed description of the invention.

SUMMARY OF THE INVENTION

It has now been found that the degree of haloalkylation of a compound having aromatic groups and having nuclear aromatic hydrogens is substantially improved when the aromatic compound is reacted with or treated with the reaction product of a formaldehyde source, a suitable polar liquid, sulfuric acid and a halide source selected from the group consisting of the tetrabromides and tetrachlorides of zirconium, titanium, hafnium and mixtures thereof. The reaction product may be formed in situ in the presence of an aromatic compound or it may be prepared first and subsequently added to an aromatic compound.

It has also been found that when the formaldehyde source comprises methylal, the polar liquid may be omitted from the reaction mixture.

The reaction product of the formaldehyde source, the suitable polar liquid which is optionally used when the formaldehyde source is methylal, the sulfuric acid and the chloride source comprises a stable, layered product comprising a low density layer and a heavy density acid layer both of which are instrumental in the haloalkylation of aromatic compounds containing at least one nuclear hydrogen per aromatic group. This layered reaction product is stable and may be used immediately or subsequently for the haloalkylation of aromatic compounds having at least one substitutable nuclear hydrogen per aromatic nucleus. A suitable haloalkylating catalyst may be optionally added to the reaction mixture of the aromatic compound and the reaction product of the formaldehyde source, polar solvent, sulfuric acid and chloride source.

In accordance with the present invention I have chloromethylated crosslinked polymers of styrene and aminated the haloalkylated crosslinked polystyrene to form an anion exchange resin having improved operating capacity.

As used herein "reaction product" or "haloalkylating agent" refers to the reaction product of the formaldehyde source, the polar liquid, sulfuric acid and the halide source.

DESCRIPTION OF THE PREFERRED EMBODIMENTS

A wide range of aromatic group-containing compounds can be treated in accordance with this invention, it being important only that the aromatic nucleus contain at least one hydrogen capable of substitution with a haloalkyl group in accordance with conventional haloalkylating methods. Thus, for example, the improved process can be employed for haloalkylation of aromatic materials, such as, for example, benzene, naphthalene, and diphenyl ether, as well as alkyl benzenes, such as, toluene, xylene and durene. Other suitable compounds include chlorobenzene, benzyl chloride and bromoethylbenzene. In addition, the product and process of this invention may be used to haloalkylate many polymers containing aromatic groups with at least one nuclear hydrogen per aromatic group, such as, for example, linear polymers of vinyl aromatic monomers including styrene, vinyl toluene, alphamethyl styrene, and vinyl pyridine, as well as copolymers of such vinyl aromatic monomers with other non-aromatic ethylenically unsaturated monomers which are copolymerizable with styrene, such as, vinyl chloride, acrylonitrile, methylacrylate and the like. Furthermore, crosslinked aromatic polymers, such as, styrene-divinylbenzene copolymers, styrene-ethylene glycol dimethacrylate, and styrene-trimethylol propane trimethacrylate and the like can be haloalkylated in accordance with this invention.

In haloalkylating a polymer or copolymer in the form of beads, such as, when haloalkylating a polymer bead suitable for the preparation of an anion exchange resin, it is highly preferred to include in the reaction mixture a suitable swelling agent in order to cause the beads to become slightly porous thereby reducing the chance of fracturing or disintegrating when the exchange groups attach to the bead structure. The use of swelling agents in the haloalkylation of resin beads is well-known in the prior art and does not form a part of this invention. In the Examples below, propylene dichloride and toluene are used as typical swelling agents. When swelling agents containing aromatic groups are used, e.g., toluene, the agent should be used after the haloalkylation step is complete to prevent haloalkylation of the swelling agent.

When the aromatic compound is the type which is used in the production of ion exchange resins, the haloalkylated polymer beads are separated by filtration from the reaction mixture which has been quenched with cold water. The separated beads are aminated in accordance with the techniques of the art and examined for operating capacity, density and the like.

In carrying out the present invention, the preferred embodiments comprise adding 0.5 – 5.0 moles of a formaldehyde source, preferably paraformaldehyde, and 0.5 – 5.0 moles of a suitable polar liquid, preferably methanol, to a reaction vessel. While stirring and cooling, 0.5 – 5.0 moles of sulfuric acid are added gradually keeping the temperature of reaction below about 40°C. followed by the addition of about 0.09 –1.0 mole of a halide source, preferably zirconium tetrachloride, gradually while maintaining the temperature below 40°C. The product of this reaction whether formed in situ in the presence of the aromatic compound or separate from it, respresents the haloalkylating agent reaction product which is useful in haloalkylating aromatic compounds having at least one hydrogen per aromatic nucleus. Following the preparation of the haloalkylating agent, in those cases where the aromatic hydrocarbon is subsequently added to the reaction vessel, the contents are preferably stirred for about 8 to about 20 hours at about 30°–65°C. Similar conditions apply for the haloalkylation carried out in situ where the reaction product is prepared in the presence of the aromatic compound. In the preferred embodiment about 1.0 mole of the aromatic compound to be haloalkylated is added to the reaction product prepared above. The haloalkylated aromatic compound is then isolated from the reaction mixture.

It is critical to provide a formaldehyde source, a suitable polar liquid, sulfuric acid and a halide source in the reaction mixture for the preparation of the haloalkylating agent. However, when the formaldehyde source is methylal, then the polar liquid may also be methylal, or alternatively stated, when the formaldehyde source is methylal, then the polar liquid is not necessary. Thus, the haloalkylating agent may be the reaction product of methylal, sulfuric acid and the halide source.

As used herein, halide source is defined as that group of compounds consisting of the tetrabromides and tetrachlorides of zirconium, titanium, hafnium and mixtures thereof. Thus, examples of halide sources are zirconium tetrachloride, titanium tetrachloride, hafnium tetrachloride, zirconium tetrabromide, titanium tetrabromide, and hafnium tetrabromide. Zirconium tetrachloride is the preferred halide source.

The formaldehyde source may be any material which is capable of forming formaldehyde under the present reaction conditions in the formation of the haloalkylating agent or "reaction product." The formaldehyde source is mixed with the polar liquid and the sulfuric acid to form a complex which is further treated with the halide source. The formaldehyde source should desirably not contain any appreciable quantity of water, since water has the effect of diluting the acid and reducing the crosslinking property of the halogen-containing, acid-formaldehyde complex formed as the reaction product. However, commercial aqueous formaldehyde solutions, such as formalin, provide substantial formation of active side chains and may be used in the present invention. Any reversible polymer of formaldehyde that acts chemically as a solid source of formaldehyde, such as the polyoxymethylenes, may be used as the formaldehyde source. Paraformaldehyde, trioxane and tetraoxymethylene are examples of suitable solid formaldehyde sources. Methylal and related compounds are also useful formaldehyde sources. Mixtures of formaldehyde sources may also be used in the present invention, for example, paraformaldehyde and methylal, polyoxymethylene and methylal, and the like.

The polar liquid as used herein, is a polar oxygen-containing liquid that is a nonsolvent for the aromatic compound which is haloalkylated by the haloalkylating agent. The polar oxygen-containing liquid or "polar liquid" is mixed with the formaldehyde source and the sulfuric acid to form the complex which, when treated with a halide source, becomes the haloalkylating agent. Polar liquids that cause formation of side chains with the aromatic compounds when mixed with the formaldehyde source, the sulfuric acid and the halide source to form the haloalkylating reaction products of this invention, are oxygen containing liquids that are nonsolvents for the haloalkylated aromatic hydrocarbons formed during the haloalkylating process of this invention. The polar liquids are substantially miscible with water. Compounds which are not strongly polar, such as chlorinated aliphatic liquids, tend to dissolve the polymer before crosslinking can be achieved, and thus are unsuitable for use in the complex when the haloalkylation agent (reaction product) is to be used in the haloalkylation of a polymeric material.

Examples of suitable polar liquids are the low molecular weight alcohols, ketones, aldehydes, liquid organic acids and nitroparaffins. Primary alcohols, up to and including butanol, are excellent for providing side chains in an aromatic polymer when the alcohols are mixed in the complex. Methanol is the polar liquid that produces best results, since it causes the introduction of a greater number of side chains into the polymer than the other polar liquids. Alcohols having a molecular weight higher than butanol are generally not suitable when the haloalkylating agent is used to treat polymeric materials since they tend to dissolve linear aromatic polymers. However, they may be used in the preparation of the reaction product when it is to be used in the haloalkylation of non-polymeric aromatic compounds. Low molecular weight liquid ketones, aldehydes, and organic acids that do not dissolve the linear aromatic polymer, such as acetone, acetaldehyde, and dichloroacetic acid are also suitable. Although nitroparaffins may be employed as the polar liquid, they provide less than half as many chains as methanol. Even water, which is a polar liquid, provides a small degree of side chain formation in the aromatic nuclei of the polymer, as long as the amount of water is not so large that it dilutes the acid sufficiently to render the complex or reaction product as used herein, ineffective. Side chain formation will occur in the presence of substantial quantities of water, however, when the haloalkylating agent or complex is to be used in the haloalkylation of polymeric materials, where crosslinking is desirable, relatively small amounts of water appreciably decrease the extent of crosslinking, and accordingly, under these circumstances water as a polar liquid is undesirable. In general, basic polar liquids should be avoided since they tend to neutralize the acid in the complex. It is within the purview of one skilled in the art to select suitable polar liquids for the particular aromatic hydrocarbon, including monomers, polymers and copolymers, undergoing haloalkylation.

In the preparation of the haloalkylating agent which is the reaction product of the formaldehyde source the polar liquid, the halide source and sulfuric acid, it is critical that the sulfuric acid be introduced into the reaction mixture to form the haloalkylating agent. Only sulfuric acid, a non-halogen containing acid, can be used in the present invention, and it must be used in conjunction with the halide source to provide the suitable haloalkylating agent. Although I do not desire to be limited by any particular theory, it appears that the polar liquid, the formaldehdye source and the sulfuric acid form a complex, and that the halide source decomposes upon contact with the complex forming a halogenated material which separates from the remaining complex by forming a low density upper layer which is maintained upon an acid layer of heavier density. The acid layer appears to act as a type of catalyst in the formation of the haloalkylated aromatic hydrocarbons. An examination of these layers when paraformaldehyde, methanol, sulfuric acid and zirconium tetrachloride were used in the formation of the haloalkylating agent, indicated that the lower density upper layer comprised chloromethyl ether, dichloromethyl ether, and methylal (in minor quantity). The acid layer also contains minor amounts of the organic materials, e.g. the chloromethyl ether, and oxides of the metal of the halide sources, e.g., oxides of zirconium, titanium and/or hafnium.

The proportions of the ingredients of the haloalkylating agent, that is, the formaldehyde source, the sulfuric acid, the polar liquid, and the halide source are not critical. When less than about 0.09 moles of the halide source per mole of haloalkyl group to be substituted on the aromatic group is added to the reaction mixture, the effectiveness of the haloalkylating agent is minimal. Best results have been achieved when the proportion of the halide source is about 0.09 to about 1.0 mole. However, the upper limit of the halide source is controlled only by the fact that increased quantities of the halide source greater than about 1.0 mole do not result in improved haloalkylation. It is for this reason that an effective amount of the halide source is required in the practice of the present invention, and as used herein an effective amount of halide source is defined as that amount of the tetrabromides anad tetrachlorides of zirconium, titanium, hafnium and mixtures thereof required in the preparation of the reaction product or complex for the haloalkylation of the aromatic compounds of this invention. The preferred molar quantities have been shown above for each of the ingredients of the reaction product, however, quantities of the ingredients of the reaction product including the formaldehyde source, the polar liquid, and the sulfuric acid, of less than about 0.5 moles produce minimal results when the reaction product is used in the haloalkylation of aromatic compounds. Furthermore, quantities greater than about 5 moles of the formaldehyde source, the polar liquid or the sulfuric acid do not result in any substantial improvement in the haloalkylation of the aromatic compounds, and accordingly, the preferred upper limit for each is set at about 5.0 moles. Thus, an effective amount of each of these reactants is required in practicing the invention and as used herein an effective amount of the formaldehyde source, the polar liquid or the sulfuric acid is that amount required to form the reaction product or complex useful in haloalkylating compounds containing at least one nuclear hydrogen-containing aromatic group. The preferred molar ratios of formaldehyde source to polar liquid to sulfuric acid is about 1–10 formaldehyde source to about 1–10 polar liquid to about 1–10 sulfuric acid.

The amount of reaction product required to haloalkylate the aromatic compounds is generally ineffective or minimal when less than about 0.5 mole of the reaction product is used per mole of aromatic compound. Although haloalkylation occurs and the process is operable when more than about 5.0 moles of the reaction product is used per mole of aromatic compound, any amount in excess of about 5.0 moles of the reaction product per mole of aromatic compound is deemed excessive. Thus, in the present invention at least about 0.5 moles of the reaction product per mole of aromatic compound is recommended, and the preferred range is 0.5 to 5.0 moles of reaction product per mole of aromatic compound, a molar ratio of reaction product to aromatic compound in the range of 0.5 to 5.0.

The preferred temperature limit for carrying out the formation of the complex or reaction product is from about 0°C to about 40°C and is designated herein as less than about 40°C. However, the temperature may be in excess of 40°C for the formation of the reaction product if proper condensing equipment is used to prevent the escape of any of the reaction ingredients or the product being formed during the reaction. Thus, the upper temperature is limited only in view of the loss of reaction ingredients or the loss of reaction product, and the preferred reaction temperature of less than about 40°C is designated as a suitable temperature at which the ingredients and products will be retained within the reaction vessel. The limitation upon the length of time over which the haloalkylating agent is formed from the reactants, is dependent mainly upon the length of time it takes to mix the formaldehyde source, the polar liquid, the sulfuric acid and the halide source to form the complex or reaction product. This may be defined as a sufficient time or the time which it takes to mix the reaction ingredients while maintaining the temperature at a level where loss of reactants and products are minimal. The preferred time is about 0.5 to 3.0 hours.

In general, haloalkylation is carried out at a temperature between about 0° and about 70°C with a reaction time of from about 0.5 hour up to about 20 hours. Normally, the reaction is run at atmospheric pressure and without a protective atmosphere. In the present invention it is preferred that the reaction between these aromatic hydrocarbons and the haloalkylating agent or complex be carried out at a temperature of about 30° – 65°C. for about 8 to about 20 hours. However, in certain cases and depending upon the aromatic hydrocarbon undergoing haloalkylation, the reaction may be complete within as little as about 0.5 hour and may be carried out at a temperature as low as about 0°C. Haloalkylation time and temperature are within the purview of one skilled in the art, and suitalbe time and temperature may be selected accordingly.

When the aromatic hydrocarbon undergoes treatment with the haloalkylating agent or the "reaction product" of the present invention, a suitable catalyst may be optionally employed for the haloalkylation reaction, and these are designated herein as "haloalkylation catalysts." Examples of haloalkylation catalyst which may be used in the present invention, are a zinc halide, such as zinc chloride, stannic chloride, aluminum chloride, ferric chloride, and antimony pentachloride. Other common haloalkylation catalysts may be used in the haloalkylation of the aromatic hydrocarbon with the haloalkylating agent of the present invention, and it is within the purview of one skilled in the art to select a suitable haloalkylation catalyst.

Using total capacity as a measure of the degree of haloalkylation on anion exchange resins, it has been found that the process of the present invention produces anion exchange resins surprisingly superior to those produced by prior art techniques. Tests upon haloalkylated aromatic hydrocarbons containing at least one hydrogen per aromatic nucleus have shown that the method and product of the present invention are applicable to monomeric materials and nonion exchange polymeric materials, and accordingly, the invention may be used for haloalkylation of such materials.

The following specific examples illustrate more clearly the exact manner in which the process of the present invention can be carried out, although the invention is not to be construed as limited in its scope thereby.

EXAMPLE 1

Paraformaldehyde (240 grams) and methanol (288 grams) were placed in a 3-liter reaction flask equipped with a thermometer, a reflux condenser and a dropping funnel. While cooling at 30°–40°C, 785 grams of sulfuric acid (98%) was added slowly through the dropping funnel over a period of one hour. Three hundred fifty grams of zirconium tetrachloride was then added over one-half hour keeping the temperature less than 40°C. Styrene bead polymer (200 grams) crosslinked with 5% (by weight) of divinyl benzene was then added to the flask. The mixture was stirred for 19 hours while maintaining a reaction temperature of 56°C., after which 400 grams of propylene dichloride was added. The reaction mixture was stirred for an additional one-half hour in order to swell the beads prior to quenching in order to prevent excessive cracking of the beads. The reaction was then quenched in cold water, and the beads were recovered.

Amination of the chloromethylated polymer beads with an aqueous solution of trimethylamine produced a highly basic anion exchange resin with a total capacity of 4.27 meq./gram dry resin.

EXAMPLE 2

Following the same procedure as in Example 1 the paraformaldehyde (240 grams) and the methanol (288 grams) were charged into the reaction flask. While cooling at 30°–40°C., 785 grams of sulfuric acid was added slowly through the dropping funnel over a period of one hour. Three hundred fifty grams of zirconium tetrachloride was then added over one-half hour keeping the temperature less than 40°C. A macroporous styrene bead polymer (200 grams) crosslinked with 16% (by weight) of ethylene glycol dimethacrylate was added to the flask. This was followed by the addition of 500 grams of propylene dichloride, and 15 grams of stannic chloride catalyst. The mixture was stirred for 19 hours while maintaining a reaction temperature of 60°C. The reaction was then quenched with cold water, and the chloromethylated polymer beads were recovered.

Amination of the chloromethylated polymer with an aqueous solution of dimethylamine produced a weak base anion exchange resin with a total capacity of 4.24 meq./gram dry resin.

EXAMPLE 3

Following the same procedure as in Example 1, the paraformaldehyde (240 grams) and the methanol (256 grams) were charged into the reaction flask. While cooling at 30° – 40°C., 785 grams sulfuric acid was added slowly through the dropping funnel over a period of 1 hour. Three hundred fifty grams of zirconium tetrachloride was then added over one-half hour keeping the temperature less than 40°C. Following this 200 grams of a macroporous styrene bead polymer crosslinked with 4% (by weight) of divinylbenzene was added to the flask. This was followed by the addition of 500 grams of propylene dichloride and 15 grams of stannic chloride. The mixture was stirred for 19 hours while maintaining a reaction temperature of 60°C. The reaction was then quenched in cold water, and the polymer beads were recovered.

Amination of the chloromethylated polymer with an aqueous solution of dimethylamine produced a weak base anion exchange resin with a total capactiy of 5.01 meq/gram dry resin.

EXAMPLE 4

The reaction flask was charged with 240 grams of paraformaldehyde and 256 grams of methanol. While cooling at 30° – 40° C., 785 grams of sulfuric acid was added slowly through the dropping funnel over a period of 1 hour. Three hundred fifty grams of zirconium tetrachloride was then added over one-half hour, keeping the temperature less than 40°C. Styrene bead polymer (200 grams) crosslinked with 7% (by weight) of trimethylolpropane trimethyacrylate was added to the flask followed by the addition of 500 grams of propylene dichloride and 15 grams of stannic chloride. The mixture was stirred for 19 hours while maintaining a reaction temperature of 60°C.

The reaction was then quenched in cold water, and the reacted polymer beads were recovered. Amination of the chloromethylated polymer with diethylenetriamine produced a weak base anion exchange resin with a total capacity of 7.55 meq/gram dry resin.

EXAMPLE 5

The reaction flask was charged with 240 grams of paraformaldehyde and 256 grams of methanol. While cooling at 30°–40°C., 785 grams of sulfuric acid was added slowly through a dropping funnel over a period of 1 hour. Four hundred grams of hafnium tetrachloride was then added over one-half hour, keeping the temperature less than 40°C. Styrene bead polymer (200 grams) crosslinked with 5% (by weight) of divinylbenzene was added to the flask. This was followed by the addition of 600 grams of propylene dichloride. The mixture was stirred for 19 hours while maintaining a reaction temperature of 60°C.

The reaction was then quenched in cold water, and the reacted polymer beads were recovered. Amination of the chloromethylated polymer with an aqueous solution of trimethylamine produced a highly basic anion exchange resin with a total capacity of 4.10 meq/gram dry resin.

EXAMPLE 6

The reaction flask was charged with 240 grams of paraformaldehyde and 256 grams of methanol. While cooling at 30°–40°C., 785 grams of sulfuric acid was added slowly through the dropping funnel over a period of 1 hour. Two hundred eighty-eight grams of titanium tetrachloride was added over one-half hour, keeping the temperature less than 40°C. Styrene bead polymer (200) grams crosslinked with 5% (by weight) of divinylbenzene was added to the flask. This was followed by the addition of 600 grams of propylene dichloride. The mixture was stirred for 19 hours while maintaining a reaction temperature of 60°C.

The reaction was then quenched in cold water, and the reacted polymer beads were recovered.

Amination of the chloromethylated polymer with an aqueous solution of trimethylamine produced a highly basic anion exchange resin with a total capacity of 1.49 meq/gram dry resin.

EXAMPLE 7

The reaction flask equipped as in Example 1 was charged with 120 grams of paraformaldehyde and 380 grams of methylal. While cooling at 30°–40°C., 785 grams of sulfuric acid was added slowly through the dropping funnel over a period of 1 hour. Three hundred fifty grams of zirconium tetrachloride was then added over one-half hour, keeping the temperature less than 40°C. Styrene bead polymer (200 grams) crosslinked with 2.8% (by weight) of divinylbenzene was added to the flask. The mixture was stirred for 19 hours while maintaining a reaction temperature of 56°C., after which 400 grams of propylene dichloride was added. The reaction mixture was stirred for an additional one-half hour in order to swell the beads before quenching. The reaction was then quenched in cold water, and the beads were recovered.

Amination of the chloromethylated polymer beads with an aqueous solution of trimethylamine produced a highly basic anion exchange resin with a total capacity of 3.67 meq/gram dry resin.

EXAMPLE 8

The reaction flask of Example 1 was charged with 240 grams of paraformaldehyde and 256 grams of methanol. While cooling at 30°–40°C., 785 grams of sulfuric acid (98%) was added slowly through a dropping funnel over a period of 1 hour. Three hundred fifty grams of zirconium tetrachloride was then added over one-half hour keeping temperature at 30°–40°C. Styrene monomer (200 grams) was then added to the flask followed by 15 grams of stannic chloride. The reaction mixture was stirred for 19 hours while maintaining a temperature of 60°C. The reaction was then quenched in cold water, and the reacted styrene monomer was recovered. The chloromethylated product had a Cl content of 13.2%.

EXAMPLE 9

The reactants were the same as in Example 8 except that 200 grams of linear polystyrene rather than styrene monomer was added to the flask. After stirring for 19 hours at a temperature of 60°C., the reation was quenched in cold water, and the reacted polymer was recovered. The chloromethylated product had a Cl content of 17.3%.

EXAMPLE 10

A reaction flask similar to that of Example 1 was charged with 240 grams of paraformaldehyde and 256 grams of methanol. While cooling at 30°–40°C., 785 grams of sulfuric acid (98%) was added slowly through a dropping funnel over a period of 1 hour. Three hundred fifty grams of zirconium tetrachloride was then added over one-half hour keeping the temperature of reaction at 30°–40°C. Stirring was then stopped and the reaction mixture separated into two layers, a lower density upper layer (methyl chloromethyl ether) (CME) and a higher density lower acid layer. The lower density upper layer was identified by gas chromatography and had the following assay:

|  | % |
|---|---|
| Chloromethyl ether | 80.8 |
| Dichloromethyl ether | 11.7 |
| Methylal | 7.5 |

While the invention has been described in connection with specific embodiments thereof, it will be understood that it is capable of further modification, and this application is intended to cover any variation, uses or adaptation of the invention. It will, therefore, be recognized that the invention is not to be considered as limited to the precise embodiments shown and described but is to be interpreted as broadly as permitted by the appended claims.

I claim:

1. A haloalkylating agent comprising the reaction product of a formaldehyde source, selected from a group consisting of formalin, paraformaldehyde, polyoxymethylene and methylal; a polar liquid selected from a group consisting of aldehydes, ketones, liquid organic acids, nitroparaffins and primary alcohols containing 1–4 carbon atoms; sulfuric acid and a halide source, selected from the group consisting of the tetrabromides and tetrachlorides of zirconium, titantium, hafnium and mixtures thereof.

2. The product of claim 1 wherein the haloalkylating agent is prepared by mixing about 0.5– 5.0 moles of formaldehyde source, about 0.5 – 5.0 moles of polar liquid and about 0.5 –5.0 moles of sulfuric acid and adding at least about 0.09 mole of the chloride source.

3. The product of claim 2 wherein the temperature is maintained below the temperature at which loss of the polar liquid occurs.

4. The product of claim 1 wherein haloalkylating agent is prepared by mixing about 0.5 – 5.0 moles of methylal and about 0.5 – 5.0 moles of sulfuric acid and adding at least about 0.09 mole of the chloride source while the temperature is maintained below the temperature at which loss of the methylal occurs.

5. The product of claim 1 wherein the formaldehyde source is polyoxymethylene.

6. The product of claim 1 wherein the formaldehyde source is paraformaldehyde.

7. The product of claim 1 wherein the formaldehyde source comprises methylal.

8. The product of claim 1 wherein the formaldehyde source and the polar liquid are methylal.

* * * * *